United States Patent [19]

Vereschagin et al.

[11] 3,949,062
[45] Apr. 6, 1976

[54] METHOD FOR PRODUCING POLYCRYSTALLINE DIAMOND AGGREGATES OF PREDETERMINED SHAPE

[76] Inventors: Leonid Fedorovich Vereschagin, Kutuzovsky prospekt, 2/1, kv. 231; Alexandr Yakovlevich Preobrazhensky, Profsojuznaya ulitsa, 52, korpus 5, kv. 21; Vasily Alexandrovich Stepanov, ulitsa Televideniya, 6/2, korpus 2, kv. 32; Valentin Semenovich Voblikov, ulitsa Novatorov 18, korpus 2, kv. 41, all of Moscow, U.S.S.R.

[22] Filed: Dec. 27, 1972

[21] Appl. No.: 319,052

[52] U.S. Cl. ................................. 423/446; 51/307
[51] Int. Cl.² ...................... B01J 3/06; C01B 31/06
[58] Field of Search ..................... 423/446; 51/307

[56] References Cited
UNITED STATES PATENTS

| | | | |
|---|---|---|---|
| 2,947,610 | 8/1960 | Hall et al. | 423/446 |
| 3,334,968 | 8/1967 | Ishizuka | 423/446 |
| 3,407,445 | 10/1968 | Strong | 423/446 X |
| 3,576,602 | 4/1971 | Kuratomi | 423/446 |

OTHER PUBLICATIONS

Bundy, "J. Chemical Physics," Vol. 38, No. 3, 1963, pp. 631–643.

*Primary Examiner*—Edward J. Meros
*Assistant Examiner*—Eugene T. Wheelock
*Attorney, Agent, or Firm*—Holman & Stern

[57] ABSTRACT

A workpiece made of a non-diamond carbonaceous material and having dimensions exceeding those of a polycrystalline diamond aggregate by a contraction coefficient value of the non-diamond material during its transformation into a polycrystalline diamond material, is enclosed with a powder-like catalyst having particle dimensions less than the minimum dimensions of the workpiece, subjected to a pressure of at least 80 kb, and heated by a pulse of electric current for a period of 0.1 to 10 seconds sufficient for the formation of said polycrystalline aggregate.

4 Claims, 5 Drawing Figures

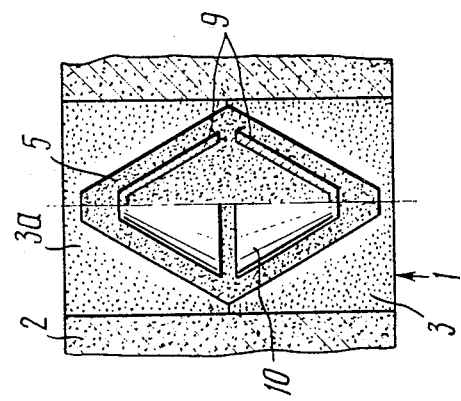
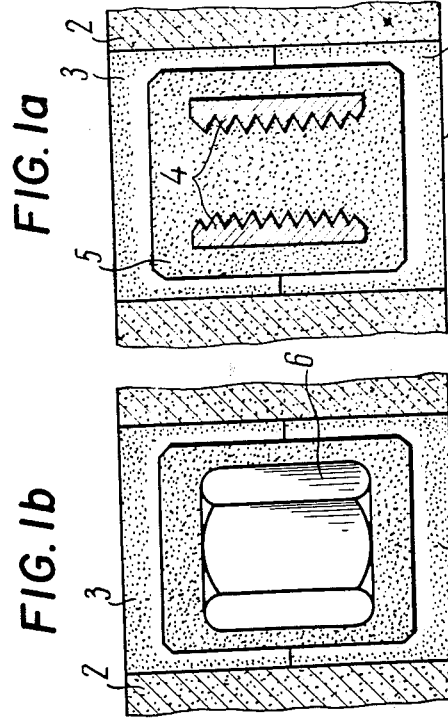
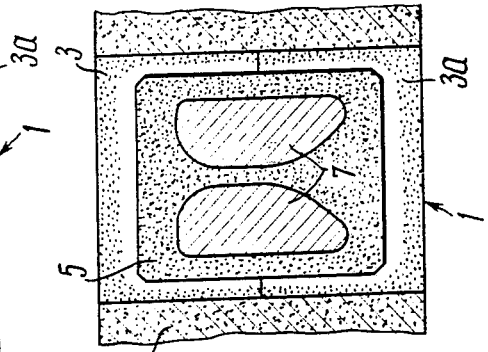
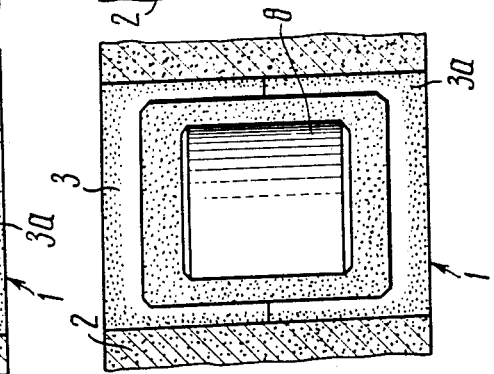

METHOD FOR PRODUCING POLYCRYSTALLINE DIAMOND AGGREGATES OF PREDETERMINED SHAPE

The present invention relates to the production of artificial diamonds and, more specifically, to methods for the production of polycrystalline diamond aggregates of a predetermined shape.

The present invention may be advantageously employed in the manufacture of machine parts (bearings), working elements of tools (chisels, drills, cutters, glass-cutters, draw plates etc.), vessels, jewelry, etc. Therefore, the method of the present invention makes it possible to employ polycrystalline diamond as a structural material for the first time in world practice.

Known in the art is a method for producing polycrystalline diamond aggregates of the druse type. This prior-art method consists in premolding a carbonaceous material such as graphite into an article of a certain shape, e.g. a cylinder. Then this cylinder, in the presence of a metal catalyst in the form of disks, is subjected to a high pressure of about 80 kb and a temperature of about 1,500°C for a period of time sufficient for the formation of polycrystalline diamond aggregates. This prior-art method makes it possible to produce diamond druses of simple forms only and with a rough surface. Such roughness may be as high as a size of an individual crystal in a druse, e.g., about 0.5 mm. Furthermore, such diamond druses contain individual diamond crystals. These inclusions may be of a size about that of the diamond crystals in a druse, with the result that the druse shape differs from the predetermined one. The transformation of such a druse even into a relatively simple machine part or a tool requires time-consuming processing, e.g., grinding.

Also known in the art is a method for producing polycrystalline diamond aggregates of a compact type. This method consists in charging a fine-grained diamond powder with grains of 0.5–5 $\mu$ size into a container followed by sintering.

The sintering is effected at a temperature within the range of from 1,800° to 1,900°C and under 65 kb pressure. This results in the formation of diamond compacts possessing insufficient mechanical strength and abrasion resistance, so that it is nesessary to take special precautions when reducing pressure after sintering.

Such low mechanical strength and abrasion resistance of diamond compacts may be attributed to the lack of intergrowth between individual diamond grains of compacts. A diamond compact shape is determined by that of the container. This limits the range of practically attainable shapes of diamond compacts to simple geometric bodies (for example, a solid cylinder).

In fact, the difference in thermomechanical properties of the container material and that of diamond powder, in the production of polycrystalline diamond aggregates under the conditions of said prior-art method, will be much more pronounced in the manufacture of diamond compacts of a more complicated form (bearings, drills, and the like). This will result in a non-uniform compression and sintering of the diamond powder in a container and, hence, distortion of the predetermined shape of a diamond compact and presence of the container material inclusions therein. Such non-uniformity in structure and properties additionally impairs the strength and abrasion characteristics of diamond compacts. Therefore, said prior-art method for producing diamond compacts does not seem to be efficient for the production of polycrystalline diamond aggregates in the form of various machine parts and tools having predetermined dimensions and shape, as well as possessing comparable (with respect to naturally occurring diamonds) strength and abrasion characteristics.

Known in the art is still another method for producing polycrystalline diamond aggregates. This method consists in enclosing a model blank made of a non-diamond carbonaceous material such as graphite, with a powder-like catalyst of titanium and tungsten carbides doped with cobalt, subjecting said blank to a pressure of at least 80 kb, and heating it by a pulse of electric current to a temperature of at least 1,500°C for a period of time of from 0.1 to 10 sec, sufficient for the formation of a polycrystalline diamond aggregate. This process provides for the production of polycrystalline diamond aggregates with a predetermined surface finish in such a manner that the model blank finish is two classes higher than the predetermined finish of a polycrystalline diamond aggregate. This prior-art method, however, does not make it possible to produce polycrystalline diamond aggregates of predetermined dimensions. It may be related to the fact that in this process, account is not taken of the contraction of the model blank carbonaceous material during the formation of a polycrystalline diamond aggregate. Also, this prior-art method does not allow the production of polycrystalline diamond aggregates of a complicated shape including openings, depressions, threads and other relief elements.

This disadvantage results from the fact that in said prior-art method no consideration is given to the necessity to select a powder-like catalyst so that its particles be of lesser dimensions than those of the model blank. Improper selection of the grain size of a powder-like catalyst causes non-uniformity in the application of pressure to the model blank, distortion of its shape and dimensions which are comparable to the particle dimensions of the powder-like catalyst, and consequently, results in a deformed polycrystalline diamond aggregate.

It is an object of the present invention to produce polycrystalline diamond machine parts, tools, vessels, and other articles of predetermined dimensions, shape, and surface finish.

Another object of the present invention is to improve the strength and abrasion characteristics of polycrystalline diamond aggregates of predetermined dimensions, shape and surface finish.

Still another object of the present invention is to substantially reduce production costs of diamond articles by lowering material and labor costs per production unit.

These and other objects of the present invention are accomplished by the present method for producing polycrystalline diamond aggregates of a predetermined shape which comprises subjecting a workpiece of a non-diamond carbonaceous material, in the presence of a powdered catalyst, to a pressure of at least 80 kb and heating, by a pulse of electric current, to a temperature of at least 1,500°C for a period of 0.1 to 10 sec sufficient for the formation of a polycrystalline diamond aggregate of a predetermined shape, the workpiece, according to the invention, having the same shape as the polycrystalline diamond aggregate of predetermined shape and dimensions exceeding those of the polycrystalline diamond aggregate of a predetermined shape by a contraction coefficient value of the non-diamond carbonaceous material during its transformation into the polycrystalline diamond material, and the powdered catalyst particles having dimensions less than the minimum dimensions of the workpiece.

It is advisable to use graphite as a non-diamond carbonaceous material for the workpiece or model blank. At present, graphite is one of the most extensively used carbonaceous materials available. A wide range of articles made of graphite presents considerable advantages for the use of graphite as a carbonaceous material in the production of model blanks.

The use of special grades of graphite such as pyrolytic graphite is known to provide a possibility for producing diamond by direct transformation of graphite lattice into diamond lattice.

When using graphite as a carbonaceous material, it is recommended that a model blank be manufactured with the dimensions exceeding, by 20 to 30%, the required dimensions of a polycrystalline aggregate of a predetermined shape. Such range of dimensions of a model blank is associated with different contraction coefficients during the transformation of various graphite grades into a polycrystalline diamond aggregate.

It is advisable to use, as a non-diamond carbonaceous material, graphite with a density of at least 2.00 g/cm$^2$. Graphite grades having high density are characterized by better coeffcients of filling as compared to generally available graphite materials, along with a less porous surface and more uniform compression strains. Such properties of dense graphites make them suitable for producing model blanks and polycrystalline diamond aggregates of a predetermined shape and with a high surface finish.

It is desirable to employ, as a non-diamond carbonaceous material, graphite possessing high processability and enabling the production of model blanks of complicated shapes. For this reason, such graphite may be advantageously used for the manufacture of polycrystalline machine parts such as bearings, tools, e.g., screw-cutting dies of great complexity.

It is advisable to employ, as a non-diamond carbonaceous material, graphite of spectral purity grade. The carbonaceous material purity provides an additional quarantee of process stability in the formation of a polycrystalline diamond aggregate and lowers the level of impurities in a polycrystalline diamond aggregate of a predetermined shape. Spectrally pure graphite in the form of articles of various shapes and dimensions can be easily processed, so that it may find a wide application for the manufacture of model blanks.

It is advisable to employ, as a non-diamond carbonaceous material, graphite with a grain size within the range of from 300 to 1,000 A, i.e. finely-grained graphite. A workpiece produced from such finely-grained graphite comprises a highly isotropic body compressible under the action of a uniformly applied pressure without shape distortion. A finely-grained graphite structure facilitates the production of polycrystalline diamond aggregates of a predetermined shape.

It is preferable to employ a powdered catalyst having a fineness of from 1 to 5 $\mu$. The use of a finely-grained catalyst ensures a highly developed surface of its contact with graphite, whereby its efficiency as a catalyst is greatly enhanced. Moreover, a powdered catalyst acts as a medium transmitting pressure to the model blank.

In this capacity, a finely-grained catalyst makes it possible to apply pressure uniformly to surface portions having linear dimensions of the order of 0.1 mm. Therefore, the use of a finely-grained catalyst makes it possible to produce polycrystalline diamond aggregates of a predetermined shape and sufficiently small dimensions.

Hence, the method for producing polycrystalline diamond aggregates of a predetermined shape according to the present invention makes it possible to produce both massive polycrystalline aggregates of a simple geometric shape, e.g., octahedrons, cylinders, spheres, and the like, and shaped articles such as screw-cutting dies, draw plates, drills, bearings, nuts, screws, and the like, and to use polycrystalline diamond, for the first time in world practice, as a structural material.

The method for producing polycrystalline diamond aggregates according to the present invention includes preforming a model blank made of a non-diamond carbonaceous material according to the shape of a polycrystalline diamond aggregate to be produced. The dimensions of the model blank should exceed those of the polycrystalline diamond aggregate of a predetermined shape by a contraction coefficient value of the non-diamond carbonaceous material during its transformation into the polycrystalline diamond aggregate of a predetermined shape. The surface of the model blank is machined to a finish superior, by approximately two classes, over that of the polycrystalline diamond aggregate surface. The the model blank is enclosed in a powdered catalyst comprising, for example VIII Group metals of the periodic system, alloys thereof, carbides, metal-carbide systems, and subjected to a high pressure of at least 80 kb. To retain the shape and integrity of the model blank during compression, especially for model blanks of a complicated shape and high surface finish, it is essential to apply pressure uniformly over the entire surface. Uniformity of compression of, for example, a graphite model blank under an external pressure depends both on properties of graphite selected for the production of the model blank, and on properties of the pressure-transmitting medium.

For this reason, to produce articles of a complicated shape and high surface finish, use should be made of graphite possessing high processability both in respect of operations for making a model blank of a specified shape and surface finish, and in respect of compression effected high pressure. A finely grained powdered catalyst is used as a medium for transmitting pressure directly to the graphite model blank. The use of a powdered catalyst is technologically rather simple and the higher the coefficient of filling the model blank relief with a powder-like catalyst, the closer the approach to the hydrostatic pressure value it ensures. Hence, the graphite model blank is dipped in a finely grained powdered catalyst so as to ensure maximum filling of voids and depressions in the model blank and of the space around it. Composition, grain size, and amount of the powder-like catalyst, as well as filling ratio ensuring uniformity of the model blank compression are determined experimentally. In this regard, the higher the compressibility isotropy of the graphite employed, the smaller the grain size of the powder-like catalyst, and the weaker the adherence between its particles during the entire compression cycle, the better fixation of the model blank relief details will be obtained.

After compressing, the graphite model blank enclosed in the powdered catalyst is heated by a pulse of electric current to a temperature of at least 1,500°C for a period of 0.1 to 10 sec. This period is sufficient for the formation of a polycrystalline aggregate of a predetermined shape.

The heating is effected due to Joule heat evolved simultaneously in the graphite model blank, powder-like catalyst (comprising, for example, VIII Group metals of the periodic system, their alloys, carbides, and metal-carbide systems), and heated during the passage of electric current there-through.

The graphite model blank is transformed into a polycrystalline diamond aggregate of a predetermined shape and finely grained structure, which is facilitated by rapid crystallization under strong oversaturation conditions. The finely grained structure of the resulting polycrystalline aggregate makes it possible, in turn, to retain the specified shape and profile of the model blank due to small dimensions of crystals adhering to each other and forming, in whole, a polycrystalline diamond aggregate. Small dimensions and a great number of crystals forming the polycrystalline diamond aggregate are due to highly developed contact surface of the powder-like catalyst with the graphite of the model blank, and consequently, multiple formation of crystallization centers. The transformation of a graphite model blank into a polycrystalline diamond aggregate occurs during the passage of electric current pulse. A high degree of geometrical similitude of the model blank and the polycrystalline diamond aggregate is attained due to isothermal conditions of transformation of the graphite model blank into a polycrystalline diamond aggregate over the whole plurality of sites where the graphite model blank is contacted by the powder-like catalyst.

These conditions are ensured due to short duration of the transformation process; they make it possible to obtain the smaller deviations from the predetermined dimensions, shape, and surface finish of a polycrystalline diamond aggregate, the more uniform are the structure and composition of the starting materials, i.e., graphite and catalyst, as well as temperature and pressure fields in a reaction cell.

Final articles comprise finely grained polycrystalline diamond aggregates of a predetermined shape, dimensions, and surface finish which may contain catalyst fragments in the form of micron thick interlayers between some individual grains of a polycrystalline diamond aggregate.

The figures depict various graphite blanks as they are prepared for transformation into polycrystalline diamond aggregates.

The method for producing polycrystalline diamond aggregates is performed in a high-temperature reaction cell 1 (FIG. 1) disposed in a container 2 made of lithographic stone. The container 2 is placed in a conventional high-pressure chamber (not shown) maintained at an elevated temperature of at least 1,500°C and under a pressure of at least 80 kb. The reaction cell 1 comprises a heater 3 and 3a, a model blank 4, and a powdered catalyst 5. Pressure is applied to the chamber by means of a hydraulic press; heat is supplied to the chamber by electric heating of the reaction cell for 0.1 to 10 sec.

Pressure within the chamber is determined by any appropriate method, for instance, by intermittent changes or resistance of reference substances (bismuth, thallium, barium, etc.). Temperature is measured both by a thermocouple and indirectly. In this latter case, for instance, the temperature at the initial stage of the polycrystalline diamond aggragate formation is evaluated by a sharp increase of the electric resistance of a reaction cell. Ceasing of electric resistance growth in the reaction cell serves as an indication of the completion of the formation of a polycrystalline diamond aggregate. The reaction cell heating is stopped by abruptly switching off the electric current. Then, the pressure within the chamber is slowly reduced to the atmospheric level. The removal of the resulting polycrystalline aggregate from the reaction cell may be effected by various methods. Thus, polycrystalline aggregates of a sophisticated shape (bearings, screw-cutting dies, draw plates, and the like) are separated from the heater graphite, catalyst particles, and by-products of the formation of a polycrystalline aggregate mainly by chemical treatment, while massive polycrystalline diamond aggregates of a simple geometric shape may be isolated from the reaction cell by means of mechanical purification methods.

EXAMPLE 1

Method for producing a polycrystalline diamond aggregate in the form of a nut.

The model blank 4 (FIG. 1a) is made of a spectrally pure graphite possessing high processability. The model blank dimensions exceed by 25% the predetermined dimensions of the diamond article. As a powdered catalyst use is made of a mixture of tungsten and titanium carbides with metallic cobalt, the mixture consisting of particles of 1 to 5 $\mu$ size. The heater 3 and 3a is made of graphite, the container 2 is made of lithographic stone. The model blank 4 is enclosed in the powdered catalyst 3, 3a inside the heater 5 so that the thread opening of the model blank 4 is filled with particles of the powdered catalyst 5 as fully as possible. The heater 3, 3a filled with the powdered catalyst 5 along with the model blank 4 is placed into the container 2. The container 2 is introduced into a conventional high-pressure chamber, wherein it is subjected to a pressure of about 100 kb and a temperature of about 2,000°C for 4 sec. As a result, a diamond article in the form of a nut 6 is obtained (FIG. 1b).

EXAMPLE 2

Method for producing a polycrystalline aggregate in the form of a draw-plate.

A model blank 7 (FIG. 2a) of a draw plate 8 (FIG. 2b) is made of graphite having the density of 2.1 g/cm³, the model blank surface finish corresponding to Class 7. The diameter of the working channel in the model blank 7 (FIG. 2a) of the draw-plate 8 (FIG. 2b) is equal to 0.25 mm. The catalyst, reaction cell 1, and conditions of the production of the polycrystalline diamond aggregate are the same as in Example 1.

EXAMPLE 3

Method for producing polycrystalline diamond aggregates in the form of two conical vessels.

Model blanks 9 (FIG. 3) of conical vessels 10 are made of fine-grained, spectrally pure graphite with a particle size ranging from 300 to 1000 A, and located in the reaction cell 1 as shown in FIG. 3. The catalyst, reaction cell 1, and conditions of the production of the polycrystalline diamond aggregates are the same as in Example 1.

In the above Examples 1 to 3, chemical treatment with a mixture of nitric and hydrofluoric acids is used for the removal of the diamond articles from the reaction cell.

Polycrystalline diamond guides for rotative motion with sliding friction produced by the method of the present invention show high strength, wear-resistance, and long service life. Thus, a spindle bearing after 5 million revolutions at the maximum rotation speed of 5,000 r.p.m. without lubrication showed no noticeable wear.

The duration of the production of one polycrystalline diamond aggregate is 2 to 3 minutes. During this short time period, all the operations are performed, starting from placing the high-pressure chamber in a press and ending with its removal therefrom. However, as it follows from Example 3, the amount of polycrystalline diamond aggregates produced simultaneously in the same reaction cell may be at least doubled, whereby the time required and production costs per production unit may be further reduced.

What is claimed is:

1. A method for producing polycrystalline diamond aggregates of a predetermined shape which comprises surrounding and enclosing a monolithic workpiece made of graphite having a grain size of from 300 to 1000 A and having said predetermined shape and dimensions exceeding those of the polycrystalline diamond aggregate of a predetermined shape by a contraction coefficient value of the graphite during its transformation into a polycrystalline diamond material, in a catalyst in powder form having a particle size of from 1 to 5 $\mu$, subjecting said workpiece to a pressure of at least 80 kb, and heating it to a temperature of at least 1,500°C for a period of 0.1 to 10 seconds sufficient for the formation of said polycrystalline aggregate.

2. A method as claimed in claim 1, wherein the said workpiece has dimensions exceeding by 20 to 30% those of the polycrystalline aggregate of a predetermined shape.

3. A method as claimed in claim 1, wherein said graphite has a density of at least 2.00 g/cm$^3$.

4. A method as claimed in claim 1, wherein said graphite is spectral purity grade graphite.

* * * * *